United States Patent
Gremaud et al.

(10) Patent No.: US 11,271,901 B2
(45) Date of Patent: Mar. 8, 2022

(54) INTEGRATED CIRCUIT

(71) Applicant: NAGRAVISION S.A., Cheseaux-sur-Lausanne (CH)

(72) Inventors: Fabien Gremaud, Cheseaux-sur-Lausanne (CH); Brecht Wyseur, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 61 days.

(21) Appl. No.: 16/958,069

(22) PCT Filed: Dec. 21, 2018

(86) PCT No.: PCT/EP2018/086570
§ 371 (c)(1),
(2) Date: Jun. 25, 2020

(87) PCT Pub. No.: WO2019/129704
PCT Pub. Date: Jul. 4, 2019

(65) Prior Publication Data
US 2021/0067488 A1      Mar. 4, 2021

(30) Foreign Application Priority Data
Dec. 29, 2017 (EP) .................................. 17211231

(51) Int. Cl.
*H04L 29/06* (2006.01)
(52) U.S. Cl.
CPC ...... *H04L 63/0227* (2013.01); *H04L 63/0209* (2013.01); *H04L 63/0272* (2013.01); *H04L 63/105* (2013.01)
(58) Field of Classification Search
CPC ............. H04L 63/0227; H04L 63/0209; H04L 63/0272; H04L 63/105; H04L 9/0897; H04L 47/32
See application file for complete search history.

(56) References Cited

U.S. PATENT DOCUMENTS 8,046,571 B1   10/2011   Feng et al.
8,285,980 B1   10/2012   Feng et al.
(Continued)

FOREIGN PATENT DOCUMENTS

| EP | 2173060 A1 | * | 4/2010 | ........... H04L 63/105 |
| EP | 2916511 A1 | * | 9/2015 | ............. H04L 63/02 |
| WO | WO-2010013092 A1 | * | 2/2010 | ........... H04L 9/0897 |

OTHER PUBLICATIONS

International Search Report and Written Opinion dated Feb. 25, 2019 in PCT/EP2018/086570 filed Dec. 21, 2018.

*Primary Examiner* — John B King
(74) *Attorney, Agent, or Firm* — Oblon, McClelland, Maier & Neustadt, L.L.P.

(57) ABSTRACT

In overview, an integrated circuit in accordance with the disclosure comprises first and second network interface processors which are separate processors and which are connected by a first unidirectional interconnect. The first unidirectional interconnect allows data transfer from the first network interface processor to the second network interface processor, while preventing data transfer in the reverse direction. The first network interface processor is for communication with a first network which may be a secure network and the second network interface processor is for communication with second network which may be a public network, for example an insecure public network. In this way, the processing of data received from each of the first and second networks is performed by separate processors and data can only be sent from the first network to the second network, thereby protecting the first network from the second network.

11 Claims, 3 Drawing Sheets

(56) References Cited

U.S. PATENT DOCUMENTS

| | | |
|---|---|---|
| 8,539,216 B1 | 9/2013 | Feng et al. |
| 8,751,786 B1 | 6/2014 | Feng et al. |
| 2014/0331305 A1* | 11/2014 | Ellis ................. G06F 21/71 726/11 |
| 2014/0337407 A1* | 11/2014 | Mraz ................. H04L 43/028 709/203 |
| 2017/0004318 A1 | 1/2017 | Griffith |
| 2017/0272455 A1 | 9/2017 | Black et al. |
| 2018/0262475 A1* | 9/2018 | Vaisband ............. H04L 9/0618 |
| 2019/0044468 A1* | 2/2019 | Ellwein ............... H02P 29/028 |
| 2019/0173920 A1* | 6/2019 | Gopal ............... H04L 63/0272 |

\* cited by examiner

INTEGRATED CIRCUIT

FIELD

The present disclosure relates to an integrated circuit, in particular, to an integrated circuit which provides for secure communication between two networks, for example where one network is a secure network and the other is a public network.

BACKGROUND

A major challenge in internet of things (IoT) and other kinds of network security is how to securely connect devices and networks and to protect operations across the networks whist maintaining functionality. In critical infrastructures, for example a secure operational technology (OT) network, where data is pushed towards an insecure network, such as the internet, for further data processing, the challenge is to protect the OT network from intrusions originating from the public network. A specific example of an OT network is a network of sensors which are part of a control system for a power station. The data generated by sensors in the sensor network of the power station control system may be sensitive, valuable and/or mission critical, so that tampering with the sensor data could represent security and safety risks. The data itself and operations on data produced by sensors in the network of sensors (such as the authentication mechanisms) need to be protected against cyber-attacks that originate from an insecure network with which the network of the sensors is in communication.

Current solutions mainly aim to isolate networks physically or via Virtual Local Area Networks. However, the problem remains that, at some point, secure and insecure networks need to communicate. This is the point at which the secure network is vulnerable to cyber-attacks originating from the insecure network. A secure, cost effective and scalable solution is needed.

BRIEF DESCRIPTION OF THE DRAWINGS

Various embodiments are now described by way of example for the purpose of explanation and illustration, with reference to the accompanying drawings in which.

DETAILED DESCRIPTION OF THE DRAWINGS

Figure 1:
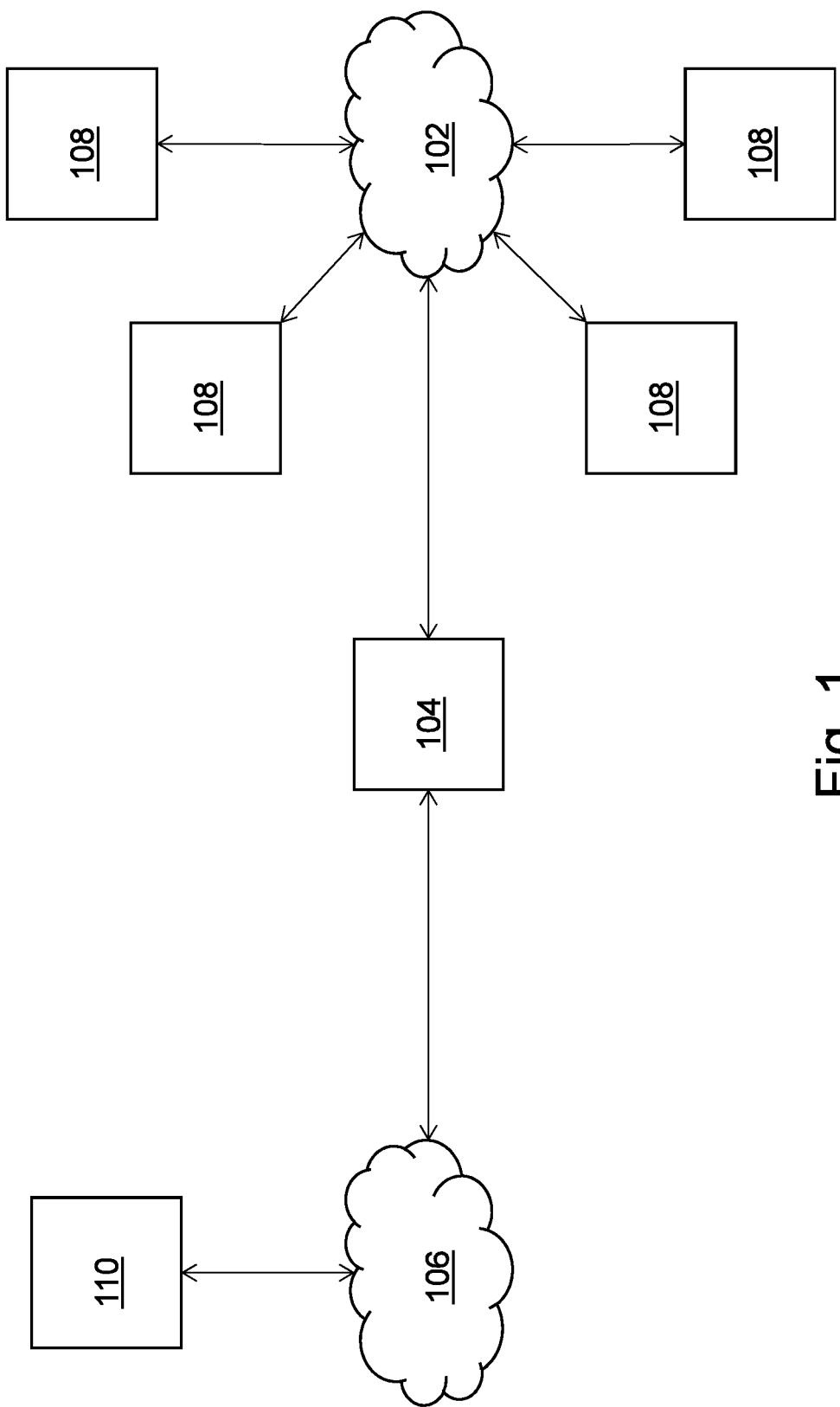
FIG. 1 illustrates a data transmission system comprising a first network in communication with a second network via an integrated circuit.

In overview, an integrated circuit in accordance with the disclosure comprises first and second network interface processors which are separate processors and which are connected by a first unidirectional interconnect. The first unidirectional interconnect allows data transfer from the first network interface processor to the second network interface processor, while preventing data transfer in the reverse direction. The first network interface processor is for communication with a first network which may be a secure network and the second network interface processor is for communication with second network which may be a public network, for example an insecure public network. In this way, the processing of data received from each of the first and second networks is performed by separate processors and data can only be sent from the first network to the second network, thereby protecting the first network from the second network.

In some aspects of the disclosure an integrated circuit is provided. The integrated circuit comprises a first network interface processor for communicating with a first network and a second network interface processor for communicating with a second network. The second network interface processor is a separate processor from the first network interface processor. A first unidirectional interconnect connecting the first and second network interface processors is also provided. The first unidirectional interconnect is configured to allow data transfer from the first network interface processor to the second network interface processor via the first unidirectional interconnect and to prevent data transfer from the second network interface processor to the first network interface processor via the first unidirectional interconnect. The first network interface processor is configured to transmit data to the second network interface processor via the first unidirectional interconnect and the second network interface processor is configured to receive data from the first network interface processor via the first unidirectional interconnect.

Advantageously, where first and second networks are respectively in communication with the first network interface processor and the second network interface processor of the integrated circuit, the first network, which may be a secure network, is able to send data to the second network, which may be a public network, in such a way that the first network is not at risk of attacks originating from the second network as data from the second network cannot be transmitted to the first network via the first unidirectional interconnect. As such, any devices of the first network, such as sensors, are protected from the public second network by the integrated circuit. The processing of network communication is separated onto a dedicated processor for each of the two networks, the processors being connected by the first unidirectional interconnect, providing further security. Further, provision of this functionality in the form of an integrated circuit is both an inexpensive and scalable mechanism for enabling secure communication from a first to a second network.

In some embodiments, the first unidirectional interconnect may comprise a first data diode configured to allow data transfer from the first network interface processor to the second network interface processor via the first unidirectional interconnect and to prevent data transfer from the second network interface processor to the first network interface processor via the first unidirectional interconnect. In some embodiments, the first data diode may be an optical data diode. A data diode allows a "one-direction data flow". It will be well understood that an optical diode is a non-limiting example, and that a hardware register with respective read-only and write-only interfaces, a unidirectional hardware bus or a unidirectional hardware bus with master write-only and slave read-only interfaces may be used. A data diode may also be a double access ram with one side limited to write function and another side limited to a read function, and the like.

In some embodiments, the first unidirectional interconnect further may comprise a first switch configured to disable the first unidirectional interconnect such that no data transfer between the first network interface processor and the second network interface processor via the first unidirectional interconnect is possible when the first switch is open. Advantageously, data flow from the first network interface processor to the second network interface processor via the first unidirectional interconnect can be prevented via operation of the switch. This enables full control of data flow through the first unidirectional interconnect as opening of the switch physically disables the first unidirectional interconnect.

In some embodiments, the integrated circuit may further comprise a secure area, for example a hardware root of trust, configured to control operation of the first switch. Advantageously, control of the first unidirectional interconnect is fully managed by the secure area and configuration of the data flow between first and second networks via the first unidirectional interconnect can be controlled securely.

In some embodiments, the integrated circuit may be configured to generate authentication data for data received at the first network interface processor from the first network. Advantageously, data received at the first network interface processor from the first network can be provided with associated authentication data such that it can be authenticated by a recipient by verifying the authentication data, where the recipient is in possession of an appropriate verification function. For example, an authenticating function may be used to provide authentication data and the recipient may be in possession of a verification function which can be used to verify the authentication data, thereby authenticating the data with which the authentication data is associated. In this way, data produced by first networks which do not comprise any means for providing authentication data can be provided with associated authentication data by the integrated circuit, by which the data can be authenticated.

In some embodiments, the integrated circuit may further comprise a second unidirectional interconnect connecting the first and second network interface processors. The second unidirectional interconnect is configured to allow data transfer from the second network interface processor to the first network interface processor via the second unidirectional interconnect and to prevent data transfer from the first network interface processor to the second network interface processor via the second unidirectional interconnect. The second network interface processor may be configured to transmit data to the first network interface processor via the second unidirectional interconnect and the first network interface processor may be configured to receive data from the second network interface processor via the second unidirectional interconnect.

In some embodiments, the second unidirectional interconnect may comprise a second data diode configured to allow data transfer from the second network interface processor to the first network interface processor via the second unidirectional interconnect and to prevent data transfer from the first network interface processor to the second network interface processor via the second unidirectional interconnect. In some embodiments, the second data diode may be an optical data diode In some embodiments, the second unidirectional interconnect may further comprise a second switch configured to disable the second unidirectional interconnect such that no data transfer between the first network interface processor and the second network interface processor via the second unidirectional interconnect is possible when the second switch is open. In some embodiments, the secure area is configured to control operation of the second switch.

Advantageously, data flow from the second network interface processor to the first network interface processor via the second unidirectional interconnect can be prevented via operation of the second switch. This enables full control of data flow through the first unidirectional interconnect as opening of the switch physically disables the first unidirectional interconnect.

In some embodiments, the integrated circuit may be configured to only permit transmission of data of a predetermined size via the second unidirectional interconnect, for example the size may be limited to the size of one or more of acknowledgment or negative-acknowledgment signals. The second unidirectional interconnect can be configured to have a very specific limited purpose. For example, only a single bit of data confirming that a piece of data passed from the first network interface processor to the second network interface processor, via the first unidirectional interconnect, has been successfully transmitted may be permitted to be sent in the reverse direction via the second unidirectional interconnect. This has applications where the first network interface processor is connected to a secure network and the second network interface processor is connected to an insecure public network as acknowledge signaling is enabled without putting any risk on the secure zone as only a limited amount of data can be sent back to the first network interface processor from the second network interface processor. Any potentially harmful data will likely be larger in size than an acknowledgment or negative-acknowledgment signal, which can be of the order of only a few bits. As such, the risk of harmful data being transmitted to the secure first network is reduced.

In some embodiments, the secure area may be configured to control operation of the second switch. Advantageously, control of the second unidirectional interconnect is fully managed by the secure area and configuration of the data flow between first and second networks via the second unidirectional interconnect can be controlled securely.

In some embodiments, the integrated circuit may be configured to authenticate data received at the second network interface processor from the second network by verifying authentication data associated with the received data. The received data may be decrypted by the second network using a key issued by the secure area. Advantageously, data received at the second network interface processor can be authenticated using corresponding authentication data, where the integrated circuit is in possession of the appropriate verification function. In some embodiments, if the authentication data is not successfully verified, the integrated circuit may be configured to prevent the associated data from being sent to the first network interface processor from the second interface processor. Advantageously, only data which has been successfully authenticated can be transmitted from the second interface processor to the first interface processor.

In some embodiments, the secure area has specific non-reversible memory configuration so that depending on its non-reversible configuration, the secure area forces the switch(es) in a permanent and non-reversible lock of the direction. The switches may be one-time programmable (OTP) switches which can be locked in an open or a closed position, after which it is not possible to alter the state of the switches. In some embodiments, the OTP switches includes a fuse which can be blown to prevent further operation of the switches or to disable the corresponding interconnect of each switch. In other embodiments, and where the switch or switches are controlled by the secure area, a memory location in the secure area that can be written to once can be provided. The desired configuration of the switch or switches (open or closed) can be written to the memory location and the configuration of the switches is then fixed. The secure area, for example the memory location, has a specific non-reversible memory configuration. Depending on its non-reversible configuration, the secure area forces the switch(es) to be "open" so either direction can be permanently disabled with the respective switch locked to an open position. In other words, the secure area forces the switch (es) to a permanent and non-reversible lock of the respective direction.

Advantageously, such an integrated circuit is configurable in that, before the OTP switch or switches have been locked in any one position, a decision as to desired states for either or both of the switches can be made, and the OTP switch or switches can be locked into the desired state.

It will be understood that, in the context of the present disclosure, a "unidirectional interconnect" is an interconnect on an integrated circuit which permits transmission of data in a first direction along the interconnect and prevents transmission of data in the reverse direction.

Likewise, in the context of the present disclosure, a "data diode", as understood in the art, allows one way transmission of data through it. For example, in embodiments where it is present, the first data diode of the first unidirectional interconnect allows data to be transmitted from the first network interface processor to the second network interface processor but prevents data transmission in the reverse direction. An example data diode is an optical data diode which comprises a light source, such as an LED, the light output of which is incident upon a light sensor, such as a phototransistor. The first network interface processor may be in communication with the light source and the second network interface processor may be in communication with the light sensor. Data can be transmitted from the first network interface processor to the light source which can transmit the data to the second network interface processor via the light sensor. It will be apparent that the light sensor is unable to transmit data to the light source and, as such, data cannot travel in the reverse direction. In this way, diode like functionality is provided.

The term "integrated circuit" has its conventional meaning, namely it is a circuit in which all or some of the circuit elements are inseparably associated and electrically interconnected so that it is considered to be indivisible for the purposes of construction and commerce. An example of an integrated circuit is a "system on a chip" (SOC). An SOC is an integrated circuit in which all the components needed for a computer or other system are included on a single chip. All of the embodiments of the integrated circuits described herein could, in some embodiments, be a system on a chip.

The second network interface processor being "separate" from the first network interface processor requires that the processors are separate entities on the integrated circuit. For example, they may be located at separate areas of a substrate of the integrated circuit and only be connected by one or more of the first and second interconnects described herein.

An OT network enables communication between hardware and software dedicated to detecting or causing changes in physical processes through direct monitoring and/or control of physical devices such as sensors, valves, pumps, and the like. OT networks enable computer systems to monitor or alter the physical state of a system. Examples include control system networks for a power station or the control network for a rail system.

If data, such as sensor data produced by a sensor in the first network, has been "authenticated", this is to be understood to mean that authentication data associated with the sensor data, such as a digital signature or a message authentication code, has been verified via the mechanisms described herein so that the recipient of the data can be reasonably sure that the data originated from the sensor and that it has not been tampered with.

"Authentication data" is any data which enables data, such as sensor data produced by a sensor in the first network, to be authenticated. Various examples are given herein. A "digital signature" is one such example. A digital signature is a mathematical scheme for demonstrating the authenticity of digital messages or documents, such as data packets. A message authentication code (MAC) data tag is another example of authentication data.

If authentication data has been "verified", this is to be understood to mean that a verification function, for example of the types described herein, has been used to determine that the authentication data is as expected hence authenticating data associated with the authentication data.

An "acknowledgment signal" is a signal sent by a recipient of data to signify receipt of the data. A "negative-acknowledgment signal" an intended recipient of data to indicate a rejection received data or to indicate some kind of error, for example where a missing data packet in a series of data packets has been detected by the intended recipient.

A "secure area" is a secure region of the integrated circuit. Examples include a trusted execution environment (TEE), such as a hardware root of trust. In general terms, the secure area is an area in which code and data loaded inside it are protected with respect to confidentiality and integrity.

A "trusted execution environment" (TEE) is an isolated environment integrated within another environment, such as the wider environment of an integrated circuit. Applications running in the TEE are named trusted applications and they can provide services such as secure storage (for example, of cryptographic keys) and cryptographic operations (for example, authentication functions, verification functions and key generation algorithms).

A "hardware root of trust" is a TEE which is implemented in hardware, such as the Synopsys tRoot. Malware cannot tamper with the functions provided by hardware roots of trust as they are implemented in hardware.

Some specific embodiments are now described by way of illustration with reference to the accompanying drawings in which like reference numerals refer to like features.

With reference to FIG. 1, an integrated circuit 104 is in communication with a first network 102. The first network 102 is a secure, for example an operational technology (OT) or private, network of sensors 108 which output measurement data. The output measurement data may relate to pressure, temperature, radioactivity, current, voltage, weight, flow, humidity, acceleration and/or positioning data, amongst other things. The integrated circuit 104 is also in communication with a second network 106. The second network 106 is a public, and hence less secure, network, such as the internet. The second network 106 is in further communication with a computer system 110 for further processing the measurement data output of sensors 108 in communication with the first network 102.

Although embodiments are described in relation to sensors 108, the sensors 108 could equally be any device which comprises a data source suitable for providing output data.

Figure 2:
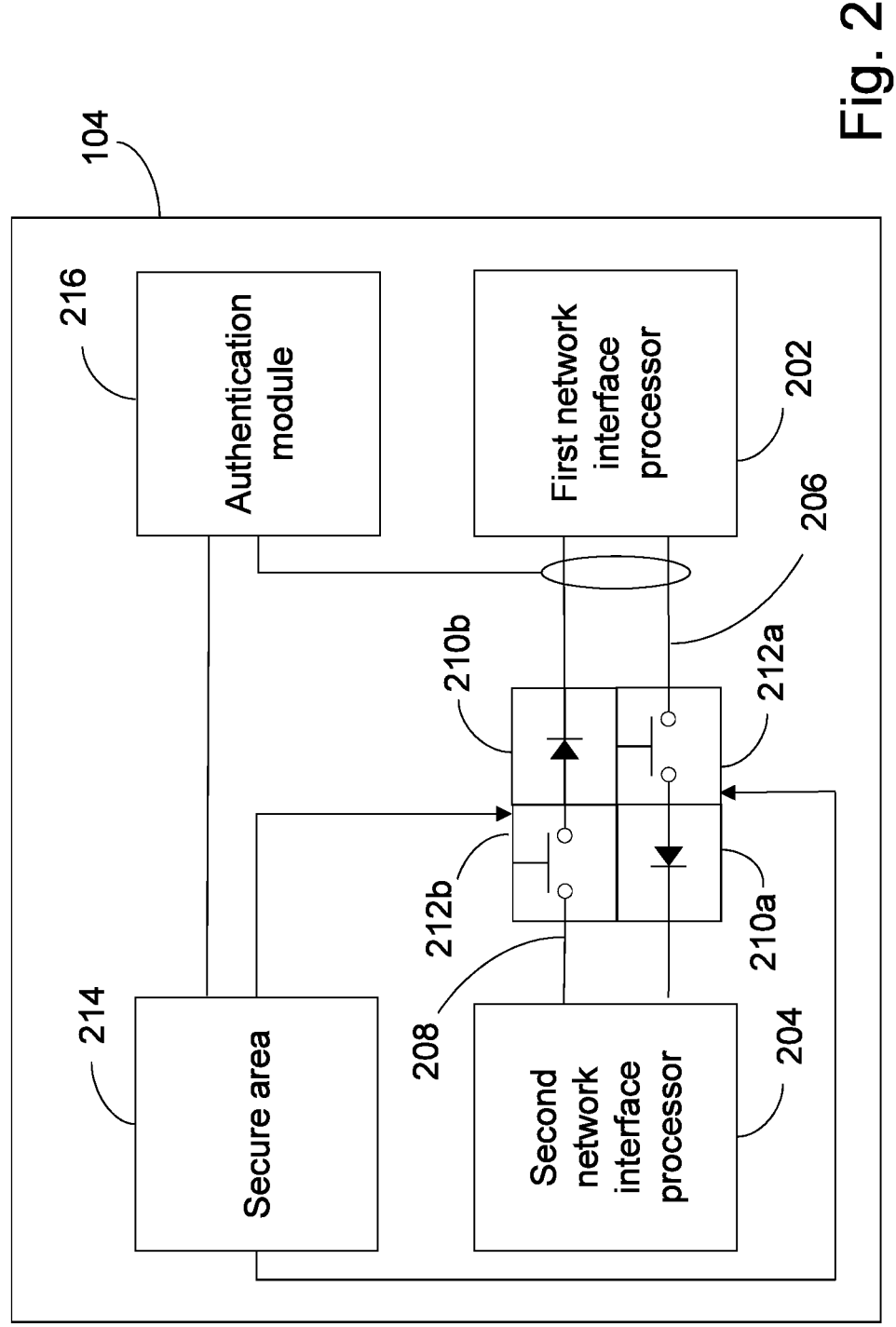
FIG. 2 illustrates an integrated circuit in further detail.

With reference to FIG. 2, some embodiments of the integrated circuit 104 are now described. The integrated circuit 104 comprises a first network interface processor 202, a second network interface processor 204, a first unidirectional interconnect 206 comprising a first data diode 210a and a first switch 212a, a second unidirectional interconnect 208 comprising a second data diode 210b and a second switch 212b, a secure area 214, and an authentication module 216.

It will be understood that FIG. 2 is an illustrative example. The authentication module 216 may verify the authenticity of the data received by the secured environment or secure network 102. It may also generate authenticity for the data generated by the secured environment 102. It may also decrypt the data received by the secured network 102. It may also encrypt the data sent by the secure network 102. Each function may be configured independently with one direction with specific keys/configurations and the other direction with other keys/configurations.

The first network interface processor 202 is arranged to communicate with the first network 102. Measurement data from sensors 108 in communication with the first network 102 is received by the first network interface processor 202. The second network interface processor 204 is a separate processor from the first network interface processor 202 such that two distinct processing environments are provided. The first unidirectional interconnect 206 and the second unidirectional interconnect 208 are the only communication paths between the first network interface processor 202 and the second network interface processor 204. In some embodiments, the first unidirectional interconnect 206 is the only communication path between the first network interface processor 202, for example where no second unidirectional interconnect 208 is provided or where the second unidirectional interconnect 208 has been disabled via the mechanisms described herein.

Each of the first unidirectional interconnect 206 and the second unidirectional interconnect 208 respectively comprise a first data diode 210a and second data diode 210b, as well as a first switch 212a and a second switch 212b. The first data diode 210a is arranged to allow data to be transmitted from the first network interface processor 202 to the second network interface processor 204 via the first unidirectional interconnect 206 and prevent data from being transmitted in the reverse direction. The second data diode 210b is arranged to allow data to be transmitted from the second network interface processor 204 to the first network interface processor 202 via the second unidirectional interconnect 208 and prevent data from being transmitted in the reverse direction.

Although the depicted embodiment makes use of first and second data diodes 210a 210b in order to provide the unidirectional functionality of the first and second interconnects 206 208, other mechanisms may be used to provide the unidirectional functionality.

The first switch 212a is arranged to disable the first unidirectional interconnect 206 such that no data transfer between the first network interface processor 202 and the second network interface processor 204 is possible via the first unidirectional interconnect 206 when the first switch 212a is open. When the first switch 212a is closed, data transfer is possible. The second switch 212b is arranged to disable the second unidirectional interconnect 208 in the same way that the first switch 121a is arranged disable the first unidirectional interconnect 206. The operation of the first and second switches 212a, 212b is controlled by the secure area 214.

In some embodiments, the first switch 212a switch and/or the second switch 212b are OTP based switches which can be locked in an open or a closed state using an OTP, after which it is not possible to alter the state of the switch.

The second network interface processor 204 is arranged to communicate with the second network 106. For example, measurement data received by the first network interface processor 202 and communicated to the second network interface processor 204 via the first unidirectional interconnect 206 may be sent by second network interface processor 204 to a computer system 110 via the second network 106 for further processing.

In alternative embodiments, the first unidirectional interconnect 206 is the only communication path between the first network interface processor 202 and the second network interface processor 204 as either no second unidirectional interconnect 208 is provided or the second unidirectional interconnect 208 has been disabled by opening of the second switch 212b. In this way, the first network interface processor 202, and therefore the first network 102, is shielded from the second network 106 as no data from second network 106 can be received by the first network interface processor 202.

In other alternative embodiments, the second unidirectional interconnect 208 may be configured to only permit transmission of data of a predetermined size and/or nature. For example, only one or more of an acknowledgment or negative-acknowledgment signal may be transmitted via the second unidirectional interconnect 208. An acknowledgment or negative-acknowledgment signal may be issued by the computer system 110 in response to receipt of measurement data from the one or more sensors 108. An acknowledgment signal may be generated and sent when the computer system 110 successfully receives a particular piece of data from the one or more sensors 108 and a negative-acknowledgment signal may be generated and sent to reject a received piece of data from the one or more sensors 108, or to indicate an error in the received piece of data. Each of the acknowledgment or negative-acknowledgment signals may be a few bits in size, for example 1, 2 or 3 bits in size. Accordingly, the integrated circuit 104 may be arranged to only allow transmission of data of 3 or less bits in size via the second unidirectional interconnect 208. Any malicious data would likely have more bits than the maximum permitted size and could not be transmitted to the first network interface processor 202 interfacing with the first network 102 via the second unidirectional interconnect 208. Therefore, the first network 102 remains protected from any malicious messages exceeding the maximum permitted size.

The secure area 214 is arranged to control operation of the first switch 212a and the second switch 212. As such, the configuration of data flow across the integrated circuit 104 can be controlled securely by the secure area 214. In some embodiments, the secure area 214 may be a trusted execution environment TEE implemented in software, such as a secure enclave or a separated dedicated secure processor to execute trusted and secure software.

In other embodiments, the secure area 214 may be a trusted execution environment implemented in hardware, such as a hardware root of trust.

The authentication module 216 is arranged to apply cryptographic functions to data received at the first network interface processor 202 from one of the sensors 108 via the first network 102 and to data received at the second network interface processor 204 from the computer system 110 via the second network 106. This may be to verify authentication data associated with the received data or to generate authentication data associated with the received data which can be verified by another entity. The authentication module can also provide data secrecy through encryption functions. In some embodiments, the authentication module 216 is part of the secure area 214 such that the cryptographic functions applied by the authentication module 216 are applied within the secure area 214.

In order to provide authentication data for data received at the first network interface processor 202, such as the measurement data sent by one of the sensors 108, an authentication function is applied to the data. The authentication function may be a message authentication code (MAC) algorithm, a signing algorithm of a digital signature scheme, or a cryptographic hash function, or an authenticated encryption algorithm that provides both data authenticity and confidentiality such as a Galois/Counter Mode. Any suitable authentication scheme may be used. In some embodiments, authentication data can be provided for data received at the second network interface processor 204, such as data sent by the computer system 110.

In order to verify authentication data received at the second network interface processor 204, such as data with associated authentication data sent by the computer system 110, a verification function is used to verify received authentication data. In some embodiments, if authentication data received at the second network interface processor 204 is not successfully verified by the verification function, it may be prevented from being transmitted to the first network interface processor 202. In some embodiments, authentication data received at the first network interface processor 202, such as data sent by one of the sensors 108, can be verified.

In the example of a MAC algorithm being used to provide authentication data for data received from one of the sensors 108 via the first network 102 which is to be transmitted from the first network interface processor 202 to the second network interface processor 204, the authentication module 216 runs the data through a MAC algorithm (which is the authentication function in this example) using a key to produce a MAC data tag (which is the authentication data in this example). The data and the MAC tag are then sent to the computer system 110 by the second network interface processor 204 via second network 106. The computer system 110 in turn runs the received data through the same MAC algorithm (which is the verification function in this example) using the same key, producing a second MAC data tag. The computer system 110 then compares the first MAC tag to the second generated MAC tag. If they are identical, the computer system 110 can safely assume that the data was not altered or tampered with during transmission and a degree of data integrity is assured.

In the example of a MAC algorithm being used to verify authentication data received from the computer system 110 via the second network 106 which is associated with data received from the computer system 110 which is to be transmitted from the second network interface processor 204 to the first network interface processor 202, the roles of the authentication module 216 and the computer system 110 are reversed, with the computer system 110 running the data to be sent to the integrated circuit 104 through a MAC algorithm to generate a MAC data tag and, upon receipt of the data and the MAC data tag, the authentication module 216 generating a second MAC data tag and verifying the data in the manner described above.

In the example of a digital signature scheme being used to provide authentication data for data received from one of the sensors 108 via the first network 102 which is to be transmitted from the first network interface processor 202 to the second network interface processor 204, a key generation algorithm first selects a private key uniformly at random from a set of possible private keys. In some embodiments, the key generating algorithm is located at the secure area 214. The key generation algorithm outputs the private key and a corresponding public key. The private key is communicated to the authentication module 216 and the public key is communicated to the computer system 110. The authentication module 216 uses a signing algorithm (which is the authentication function in this example) to produce a signature (which is the authentication data in this example) using the data (or, alternatively, a hash or digest of the data) and the private key. The signature is then sent to the computer system 110, for example along with the data. Upon receipt, the signature, the data (or a hash or digest of the data from the first data packet where such has been used by the signing algorithm), and public key are run through a signature verifying algorithm (which is the verification function in this example) by the computer system 110, and the authenticity of the data is either accepted or rejected dependent upon the outcome.

In the example of a digital signature scheme being used to verify authentication data received from the computer system 110 via the second network 106 which is associated with data received from the computer system 110 which is to be transmitted from the second network interface processor 204 to the first network interface processor 202, the roles of the authentication module 216 and the computer system 110 are reversed, with the computer system 110 signing the data to generate a signature in the manner described above and the authentication module 216 verifying signature to authenticate the data in the manner described above.

Cryptographic keys used by the authentication and verification functions may be provisioned by the secure area 214 and may be configured during manufacture of the integrated circuit. The keys may be session keys computed using a key sharing protocol which is common to both the secure area 214 and the recipient of the data subject to the cryptographic function, for example the computer system 110.

In some embodiments, data transmitted from the first network interface processor 202 to the second network interface processor 204 is provided with authentication data generated by the authentication module 216. The recipient computer system 110, is then able to authenticate the data by verifying the authentication data using a verification function. In this way, the authentication module 216 of the integrated circuit 104 can add authentication data to measurement data received from the sensor 108. As such, authentication data can be provided for sensors, and any other devices in communication with the first network 102, which are unable to produce their own authentication data.

Equally, in some embodiments data transmitted from the second network interface processor 204 to the first network interface processor 202 may be provided with authentication data generated by the authentication module 216.

In some embodiments, data transmitted from the second network interface processor 204 to the first network interface processor 202 is authenticated by the authentication module 216 by applying a verification function to authentication data associated with the data to verify the authentication data. Data received at the second network interface processor 204 via the second network 106 from the computer system 110 may be authenticated. Authentication data associated with the data can be verified by the authentication module 216 using a verification function so as to authenticate the received data. In some embodiments, only data received at the second network interface processor 204 which has been successfully authenticated is permitted to be transmitted from the second network interface processor 204 to the first network interface processor 202.

Equally, in some embodiments authentication data associated with data received at the first network interface processor 202 may be verified using a verification function by the authentication module 216 to authenticate the data.

Figure 3:
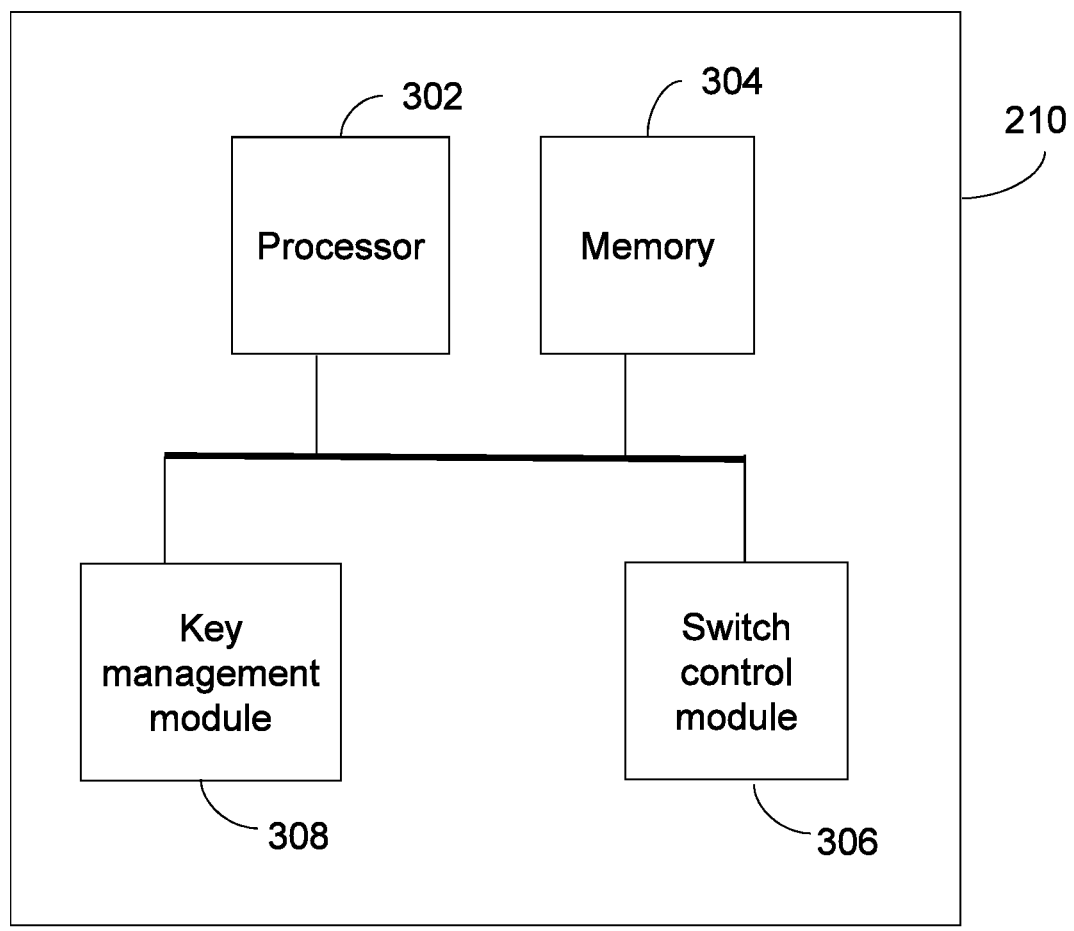
FIG. 3 illustrates a secure area of the integrated circuit in further detail.

With reference to FIG. 3, embodiments of a secure area 214 are now described. The secure area 214 comprises a processor 302, a memory 304, a switch control module 306, and a key management module 308. The processor 302 is arranged to coordinate between the switch control module 306 and a key management module 308. The memory 304 can store instructions for execution by the processor 302 to cause the processor 302 to provide desired functionality. In some embodiments, the authentication module 216 is also part of the secure area 214: a non volatile memory may be integrated to store Root keys such as OTP cells and/or some hardware crypto blocks.

The secure area 214 is a secure region of the integrated circuit 104. The secure area 214 is an area in which code and data loaded inside it are protected with respect to confidentiality and integrity. For example, the secure area 214 may comprise an isolated execution environment with processing and memory resources separate and isolated from rest of the integrated circuit. Access to the secure area 214 may be via secure mailbox arrangement.

In some embodiments, the secure area 214 is a trusted execution environment (TEE) implemented as an isolated environment integrated within the wider environment of integrated circuit 104. Applications running in the TEE (such as the switch control module 306, the key management module 308 and, in some embodiments, the authentication module 216) are named trusted applications as they are protected with respect to confidentiality and integrity and can be executed within the isolated environment of the secure area 214.

In some embodiments, the secure area 214 is a hardware root of trust is a TEE which is implemented in hardware, such as the Synopsys tRoot. Malware cannot tamper with the functions provided by hardware roots of trust as they are implemented in hardware.

In some embodiments, the secure area 214 is a trusted execution environment, for example, a hardware root of trust, such as the such as the Synopsys tRoot.

The switch control module 306 is arranged to securely control operation of the first switch 212a and the second switch 212b as control operations for the switches are performed within the secure are 214.

The key management module 308 is arranged to provide the authentication module 216 with cryptographic keys required to encrypt and/or decrypt data as described above. In some embodiments, the key management module 308 is arranged to provide the computer system 110 with cryptographic keys required to encrypt and/or decrypt data as described above.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. An integrated circuit comprising:
   a first network interface processor for communicating with a first network;
   a second network interface processor for communicating with a second network, wherein the second network interface processor is a separate processor from the first network interface processor; and
   a first unidirectional interconnect connecting the first and second network interface processors;
   wherein the first unidirectional interconnect is configured to allow data transfer from the first network interface processor to the second network interface processor via the first unidirectional interconnect and to prevent data transfer from the second network interface processor to the first network interface processor via the first unidirectional interconnect,
   wherein the first unidirectional interconnect includes a first switch configured to disable the first unidirectional interconnect, operation of the first switch being made from a secure area having a root of trust, and
   wherein the first network interface processor is configured to transmit data to the second network interface processor via the first unidirectional interconnect; and
   the second network interface processor is configured to receive data from the first network interface processor via the first unidirectional interconnect.

2. The integrated circuit of claim 1, wherein the first unidirectional interconnect comprises a first data diode configured to allow data transfer from the first network interface processor to the second network interface processor via the first unidirectional interconnect and to prevent data transfer from the second network interface processor to the first network interface processor via the first unidirectional interconnect, optionally, wherein the data diode is an optical data diode.

3. The integrated circuit of claim 1, wherein the integrated circuit is configured to generate authentication data for data received at the first network interface processor from the first network.

4. The integrated circuit of claim 1, the integrated circuit further comprising a second unidirectional interconnect connecting the first and second network interface processors,
   wherein the second unidirectional interconnect is configured to allow data transfer from the second network interface processor to the first network interface processor via the second unidirectional interconnect and to prevent data transfer from the first network interface processor to the second network interface processor via the second unidirectional interconnect,
   wherein the second network interface processor is configured to transmit data to the first network interface processor via the second unidirectional interconnect; and
   the first network interface processor is configured to receive data from the second network interface processor via the second unidirectional interconnect.

5. The integrated circuit of claim 4, wherein the second unidirectional interconnect comprises a second data diode configured to allow data transfer from the second network interface processor to the first network interface processor via the second unidirectional interconnect and to prevent data transfer from the first network interface processor to the second network interface processor via the second unidirectional interconnect, optionally, wherein the data diode is an optical data diode.

6. The integrated circuit of claim 4, wherein the second unidirectional interconnect further comprises a second switch configured to disable the second unidirectional interconnect such that no data transfer between the first network interface processor and the second network interface processor via the second unidirectional interconnect is possible when the second switch is open.

7. The integrated circuit of claim 6, wherein the secure area is configured to control operation of the second switch.

8. The integrated circuit of claim 4, wherein integrated circuit is configured to only permit transmission of data of a predetermined size via the second unidirectional interconnect.

9. The integrated circuit of claim 4, wherein the integrated circuit is configured to authenticate data received at the second network interface processor from the second network by verifying authentication data associated with the received data.

10. The integrated circuit of claim 9, wherein the received data is decrypted by the second network using a key issued by the secure area.

11. The integrated circuit of claim 1, wherein the secure area has a specific non-reversible memory configuration so that depending on its non-reversible configuration, the secure area forces the switch or switches to a permanent and non-reversible lock of the respective direction.

* * * * *